US009546590B2

(12) United States Patent
Radmard et al.

(10) Patent No.: US 9,546,590 B2
(45) Date of Patent: Jan. 17, 2017

(54) CHARGE AIR COOLER CONDENSATE RESERVOIR

(71) Applicant: FORD GLOBAL TECHNOLOGIES, LLC, Dearborn, MI (US)

(72) Inventors: Stephen Radmard, London (GB); Martin James Styles, Billericay (GB); Graham Michael Kudar, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/828,971

(22) Filed: Aug. 18, 2015

(65) Prior Publication Data

US 2016/0061100 A1 Mar. 3, 2016

(30) Foreign Application Priority Data

Sep. 1, 2014 (GB) .................................. 1415403.3

(51) Int. Cl.
*F02B 29/04* (2006.01)

(52) U.S. Cl.
CPC ....... *F02B 29/0468* (2013.01); *F02B 29/0475* (2013.01); *F02M 26/28* (2016.02); *F02M 26/32* (2016.02); *Y02T 10/121* (2013.01); *Y02T 10/146* (2013.01)

(58) Field of Classification Search
CPC .. F02B 29/0468; F02B 29/0475; F02M 26/28; F02M 26/32; Y02T 10/121; Y02T 10/146; F01N 3/005; F01N 13/00
USPC ............................................ 60/605.2, 605.3
See application file for complete search history.

(56) References Cited

U.S. PATENT DOCUMENTS

| 8,104,456 | B2 * | 1/2012 | Yacoub | F01N 13/009 123/25 A |
|---|---|---|---|---|
| 9,103,269 | B2 * | 8/2015 | Bishop | F02B 29/0468 |
| 2009/0205326 | A1 * | 8/2009 | Watson | F01N 3/005 60/309 |
| 2011/0094219 | A1 * | 4/2011 | Palm | F02B 29/0468 60/599 |
| 2011/0107760 | A1 | 5/2011 | Quinn et al. | |
| 2014/0158096 | A1 | 6/2014 | Leone et al. | |

FOREIGN PATENT DOCUMENTS

| CN | 201258798 Y | 6/2009 |
|---|---|---|
| DE | 102011108458 A1 | 1/2013 |

(Continued)

OTHER PUBLICATIONS

Great Britain Office Action for corresponding Application No. GB1415403.3, mailed Feb. 25, 2015, 5 pages.

*Primary Examiner* — Nicholas J Weiss
*Assistant Examiner* — Dapinder Singh
(74) *Attorney, Agent, or Firm* — Brooks Kushman P.C.; Greg P. Brown (57) ABSTRACT

A condensate reservoir for a charge air cooler of an engine has one or more inlets for receiving condensate from the charge air cooler, and a chamber for collecting the condensate from the charge air cooler. The condensate reservoir is configured to be in thermal communication with an exhaust gas recirculation duct of the engine such that thermal energy from the exhaust gas recirculation duct may be transferred to the condensate reservoir to vaporize the condensate collected in the chamber.

20 Claims, 5 Drawing Sheets (56) References Cited

FOREIGN PATENT DOCUMENTS

| | | | |
|---|---|---|---|
| EP | 2735833 | A2 | 5/2014 |
| FR | 2940366 | A1 | 6/2010 |
| JP | 2011196620 | A | 10/2011 |

\* cited by examiner

CHARGE AIR COOLER CONDENSATE RESERVOIR

CROSS-REFERENCE TO RELATED APPLICATIONS

This application claims foreign priority benefits under 35 U.S.C. §119(a)-(d) to GB 1415403.3 filed Sep. 1, 2014, which is hereby incorporated by reference in its entirety.

TECHNICAL FIELD

The present disclosure relates a condensate reservoir for a charge air cooler of an engine and a method of collecting condensate from a charge air cooler of an engine. The present disclosure may particularly but not exclusively relate to a condensate reservoir that is configured to be in thermal communication with an exhaust gas recirculation duct of the engine.

BACKGROUND

Modern engines may be turbocharged or supercharged to compress the air entering the engine and thereby increase the power output of the engine. However, compressing the air may increase the temperature of the air. In this respect, a charge air cooler (CAC) may be provided to cool the air and increase its density. The potential power output of the engine may be further increased as a result.

However, condensate may form in the CAC, particularly when the ambient air temperature is low, or during humid or wet weather conditions. Exhaust Gas Recirculation (EGR) may also contribute to condensation. Condensate may collect at the bottom of the CAC, or in the internal passages. When the air flow rate is increased, e.g. to provide an increase in torque, the increased air flow rate may carry the condensate from the CAC, drawing it into the engine. Also, if a vehicle is tilted, e.g. when going downhill or over a bump, condensation in the CAC may be disturbed and enter the engine. The likelihood of engine misfire and combustion instability may be increased as a result.

Accordingly, some systems may include a CAC with a drain angle allowing condensate to drain into the engine, thereby preventing accumulation within the CAC. However, providing the CAC with such a drain angle may introduce design and packaging problems that increase cost, reduce vehicle performance and may even compromise the safety of the vehicle.

SUMMARY

According to a first aspect of the present disclosure there is provided a condensate reservoir for a charge air cooler of an engine, the condensate reservoir comprising: one or more inlets for receiving condensate from the charge air cooler; and a chamber for collecting the condensate from the charge air cooler; wherein the condensate reservoir is configured, e.g. shaped, to be in thermal communication with an exhaust gas recirculation duct of the engine such that thermal energy from the exhaust gas recirculation duct may be transferred to the condensate reservoir to vaporise the condensate collected in the chamber.

The condensate reservoir may be disposable, e.g. provided, around the exhaust gas recirculation duct. For example, the condensate reservoir may be disposable at least partially around a perimeter of the exhaust gas recirculation duct. The exhaust gas recirculation duct may be substantially tubular. The condensate reservoir may also be tubular. The exhaust gas recirculation duct and the condensate reservoir may or may not have the same cross-section. In a particular example, either or both of the exhaust gas recirculation duct and the condensate reservoir may have a substantially circular cross-section. Accordingly, the condensate reservoir may be circumferentially disposable around the exhaust gas recirculation duct and the condensate reservoir may form an annular reservoir about the exhaust gas recirculation duct.

The chamber of the condensate reservoir may be defined by one or more walls of the condensate reservoir and an outer wall portion of the exhaust gas recirculation duct. In other words, the condensate reservoir may share a wall with the exhaust gas recirculation duct. Although the condensate reservoir and the exhaust gas recirculation duct may be in thermal communication, the condensate reservoir and the exhaust gas recirculation duct may not be in fluidic communication, e.g. such that exhaust gases may not flow into the condensate reservoir. The vaporised condensate may return to the charge air cooler via one or more of the condensate reservoir inlets or through an outlet.

However, it is also envisaged that the wall shared between the condensate reservoir and the exhaust gas recirculation duct may permit the transfer of fluid between the condensate reservoir and the exhaust gas recirculation duct, for example a portion of such a wall may be permeable, e.g. gas permeable. In this way, vaporised condensate may transfer into the exhaust gas recirculation duct. The permeable portion may be arranged above the condensate inlet(s) such that condensate that collects at the bottom of the reservoir may not permit exhaust gases from the exhaust gas recirculation duct to flow to the charge air cooler. The permeable portion may additionally or alternatively be arranged above a maximum anticipated condensate level such that liquid condensate may not pass into the exhaust gas recirculation duct.

The condensate reservoir may comprise a first opening in a first wall of the condensate reservoir. The first opening may be configured to receive the exhaust gas recirculation duct. The exhaust gas recirculation duct may pass through the first opening. The condensate reservoir may comprise a second opening in a second wall of the condensate reservoir. The second opening may be configured to receive the exhaust gas recirculation duct. The exhaust gas recirculation duct may pass through the second opening.

One or more of the inlets may be arranged at or towards the top of the condensate reservoir when the condensate reservoir is in an installed configuration. Alternatively or additionally, one or more of the inlets may be arranged at or towards the bottom of the condensate reservoir when the condensate reservoir is in the installed configuration.

The condensate reservoir may be sized with a volume of the chamber capable of containing the maximum amount of condensate that is anticipated to be created in the charge air cooler. For example, in hot and/or humid conditions, more liquid water may condense out of the charge air and the volume of the chamber may be such to cope with a worst case scenario.

The condensate reservoir may comprise a level sensor configured to sense the level of the liquid condensate collected in the chamber. The condensate reservoir may comprise a temperature sensor configured to measure the temperature of the liquid condensate collected in the chamber.

A charge air cooler system may comprise: the above-mentioned condensate reservoir; and the charge air cooler.

The charge air cooler may comprise one or more drains arranged to drain the condensate formed in an air passage of the charge air cooler. The charge air cooler may comprise one or more drain channels configured to guide the condensate within the charge air cooler toward the one or more drains. The charge air cooler system may further comprise one or more drain passages provided between the charge air cooler and the condensate reservoir inlets. The drain passages may permit the condensate to collect in the condensate reservoir.

The charge air cooler may comprise a charge air inlet chamber and a charge air outlet chamber. The one or more drain passages may extend from the charge air inlet chamber and/or the charge air outlet chamber to the condensate reservoir inlets.

An engine system may comprise: the above-mentioned charge air cooler system, and one or more of the exhaust gas recirculation ducts. The exhaust gas recirculation ducts may be a High Pressure (HP), a Low Pressure (LP) exhaust gas recirculation duct or both.

According to a second aspect of the present disclosure there is provided a method of collecting condensate from a charge air cooler of an engine, the method comprising:

receiving condensate from the charge air cooler into a condensate reservoir via one or more inlets of the condensate reservoir;

collecting the condensate from the charge air cooler in a chamber of the condensate reservoir; and transferring thermal energy from an exhaust gas recirculation duct of the engine to the condensate reservoir to vaporise the condensate collected in the chamber.

The method may further comprise returning the vaporised condensate to the charge air cooler. The vaporised condensate may then flow from the charge air cooler to the engine, e.g. to an intake manifold of the engine.

The method may further comprise determining the amount of condensate collected in the condensate reservoir. The method may further comprise estimating the collection rate of condensate based on operational parameters.

The method may further comprise determining the temperature of the condensate stored in the condensate reservoir.

The method may further comprise determining the vaporisation rate of the condensate in the condensate reservoir, for example based on the temperature of the exhaust gases in the exhaust gas recirculation duct, e.g. upstream of the condensate reservoir. The method may further comprise determining the rate of heat loss from the exhaust gases in the exhaust gas recirculation duct to the condensate in the condensate reservoir.

The method may further comprise adjusting a flow rate of the exhaust gases in the exhaust gas recirculation duct, e.g. based on the rate of heat loss from the exhaust gases in the exhaust gas recirculation duct to the condensate in the condensate reservoir.

One or more controllers, e.g. engine controllers, may be configured, e.g. programmed, to carry out any of the above-mentioned methods. An engine control unit may comprise, at least in part, the above-mentioned controllers.

Software which when executed by a computing apparatus may cause the computing apparatus to perform any of the above-mentioned methods. The one or more engine controllers may be provided with computer readable instructions on non-transitory memory for carrying out any of the above-mentioned methods.

A vehicle or engine may comprise the above-mentioned condensate reservoir, the above-mentioned charge air cooler system and/or the above-mentioned engine system.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
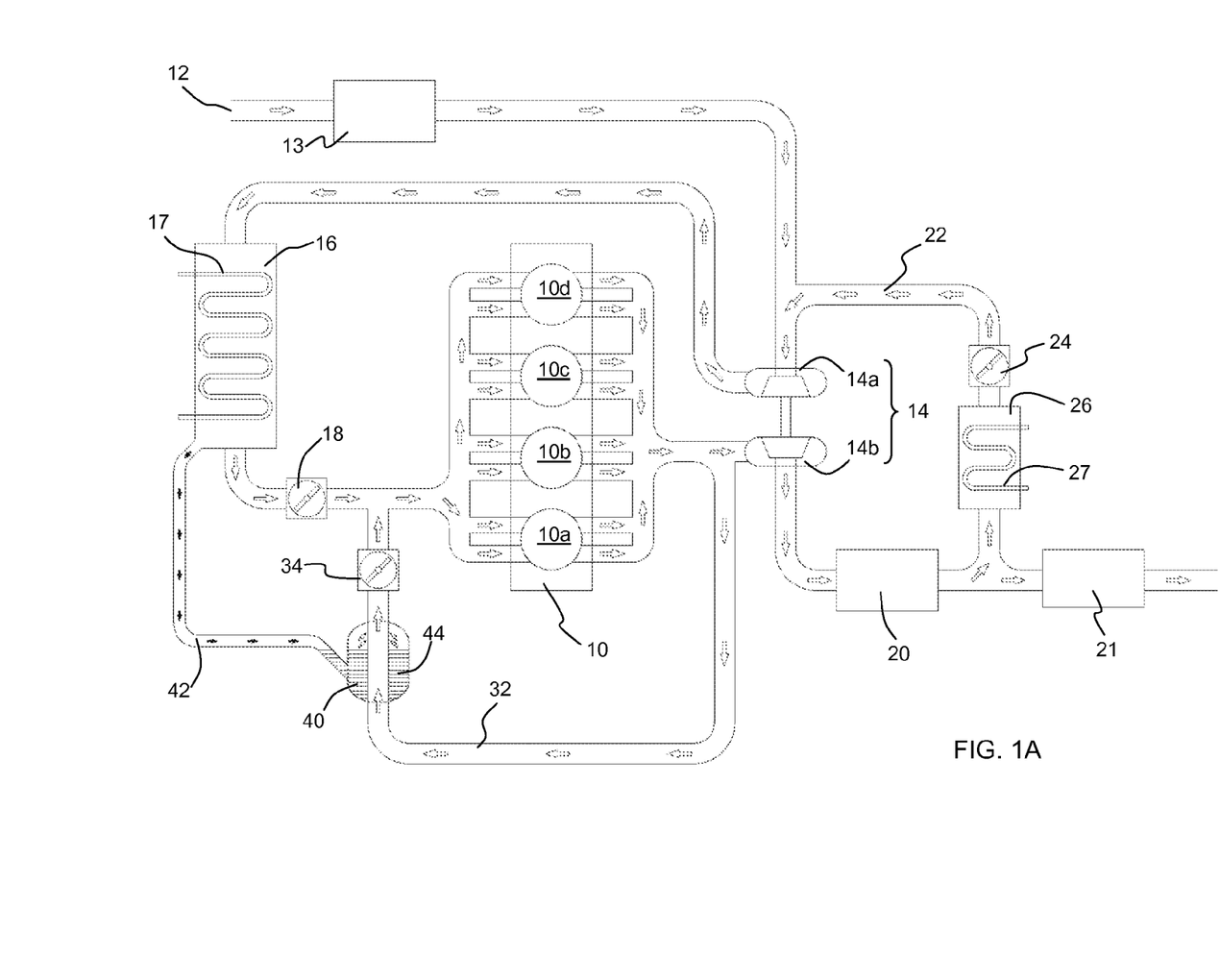
FIGS. 1A and 1B are schematic views of the air and exhaust flow paths in an engine with a condensate reservoir and charge air cooler system according to examples of the present disclosure.
Figure 1B:
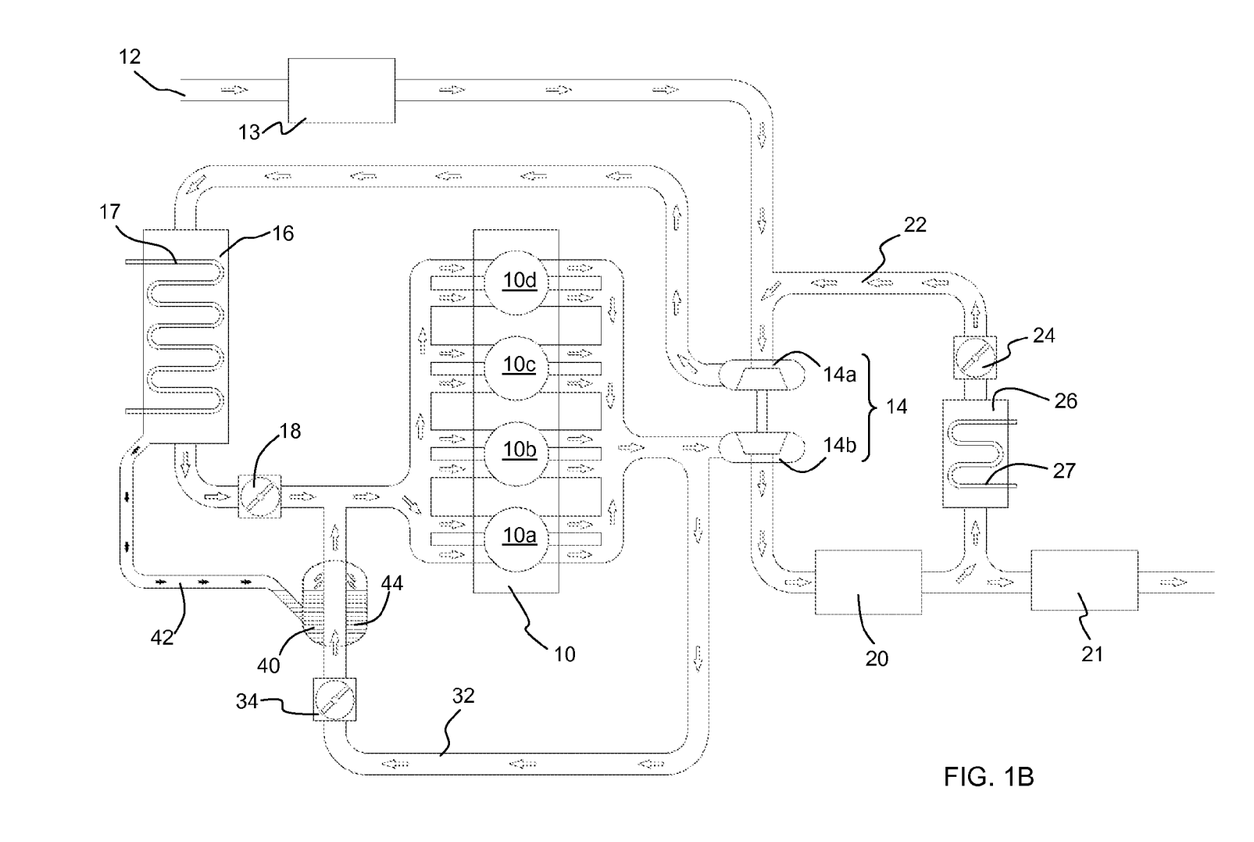

With reference to FIGS. 1A and 1B, a typical air path for an internal combustion engine 10 of a motor vehicle is described. Air may enter through an inlet 12 and then pass through an air filter 13. The air may then pass through a compressor 14a of a turbocharger 14. The turbocharger 14 may improve the engine power output and reduce emissions. Typically, the turbocharger 14 is arranged with an exhaust gas driven turbine 14b driving the compressor 14a mounted on the same shaft. A charge air cooler 16 is provided downstream of the turbocharger compressor 14a. The charge air cooler 16 may further increase the density of the air entering the internal combustion engine 10, thereby improving its performance. The air may then enter the internal combustion engine 10 via a throttle 18 configured to vary the mass flow of air into the internal combustion engine.

In a particular example of the present disclosure, the internal combustion engine 10 comprises a diesel engine, however, it is equally envisaged that the engine 10 may be a spark ignition engine. As is depicted in FIGS. 1A and 1B, the internal combustion engine 10 may comprise a number of cylinders 10a-d and the air may flow into each of these cylinders at an appropriate time in the engine's cycle as determined by one or more valves (not shown).

The exhaust gases leaving the internal combustion engine 10 may pass through the turbine 14b of the turbocharger. One or more exhaust treatment modules 20 may be provided downstream of the turbine 14b, e.g. to reduce emissions from the engine exhaust. The exhaust treatment modules 20 may comprise one or more of an oxidation catalyst, e.g. a diesel oxidation catalyst, and a particulate filter, e.g. a diesel particulate filter. A further exhaust treatment module 21 may be provided, e.g. downstream of the exhaust treatment module 20.

A first exhaust gas recirculation loop 22 configured to selectively recirculate exhaust gases from the internal combustion engine 10 back into the internal combustion engine may also be provided. The first exhaust gas recirculation loop 22 may be provided about the turbocharger 14 such that exhaust leaving the turbine 14b may be recirculated into the inlet of compressor 14a. The first exhaust gas recirculation loop 22 may be diverted from the main exhaust flow path, e.g. upstream or downstream of the exhaust treatment module 20. The first exhaust gas recirculation loop 22 may comprise a first recirculation valve 24, which may control the amount of recirculation through the first exhaust gas recirculation loop 22. In addition an exhaust gas cooler 26 may be provided in the exhaust gas recirculation loop 22. The exhaust gas cooler 26 may be cooled by virtue of fluid, e.g. water, flowing through a coolant passage 27, which may be part of a coolant circuit (not shown) of the engine 10.

A second exhaust gas recirculation loop 32 configured to selectively recirculate exhaust gases from the internal combustion engine 10 back into the internal combustion engine may also be provided. The second exhaust gas recirculation loop 32 may be provided about the engine 10 with exhaust gases leaving the engine 10 being recirculated to the air inlet of the engine 10. The second exhaust gas recirculation loop 32 may be diverted from the main exhaust flow path, e.g. at a point between the engine 10 and the turbine 14b of the turbocharger. Accordingly, the exhaust gases in the second exhaust gas recirculation loop 32 may be at a higher pressure than the exhaust gases in the first exhaust gas recirculation loop 22. The second exhaust gas recirculation loop 32 may comprise a second recirculation valve 34 which may control the amount of recirculation in the second exhaust gas recirculation loop 32. In addition, a condensate reservoir 40, which will be described in more detail below, may be provided around a portion of the second exhaust gas recirculation loop 32. The charge air cooler 16 may be cooled by virtue of a fluid, such as water, flowing through a coolant passage 27, which may be part of a coolant circuit (not shown) of the engine 10.

As is depicted in FIG. 1A the coolant reservoir may be upstream of the second recirculation valve 34 in the second exhaust gas recirculation loop 32. However, as depicted in FIG. 1B, the coolant reservoir 40 may be provided downstream of the second recirculation valve 34 in the second exhaust gas recirculation loop 32.

Referring still to FIGS. 1A and 1B, a passage 42 may be provided between the charge air cooler 16 and the condensate reservoir 40. The passage 42 may be arranged so as to permit condensate collected in the charge air cooler 16 to flow to the condensate reservoir 40. Water vapour and/or liquid may be present in the air that enters the air inlet 12 and as the air passes over outer surfaces of the coolant passage 17 in the charge air cooler 16 the water present in the air may form condensation. Condensation formed in the charge air cooler 16 may be collected and transferred to the condensate reservoir 40 by virtue of the passage 42. In this way liquid water may be prevented from entering the internal combustion engine 10 where it may have otherwise interfered with the efficient operation of said engine.

As is depicted in FIGS. 1A and 1B, the condensate reservoir 40 is disposed about the second exhaust gas recirculation duct 32. The collected liquid condensate which is held in a chamber 44 defined by the condensate reservoir is in thermal communication with the exhaust gases in the second exhaust gas recirculation loop 32. Accordingly, heat may be transferred from the exhaust gases in the second exhaust gas recirculation loop 32 to the liquid condensate in the condensate reservoir 40 such that the condensate may be vaporised into gaseous form. The vaporised condensate may return to the charge air cooler 16, e.g. via passage 42, and the vaporised condensate may then enter the internal combustion engine 10.

Although the above has described the condensate reservoir being provided about the second exhaust gas recirculation loop 32, it is also envisaged that the condensate reservoir may be provided about the first exhaust gas recirculation loop 22.

Figure 2A:
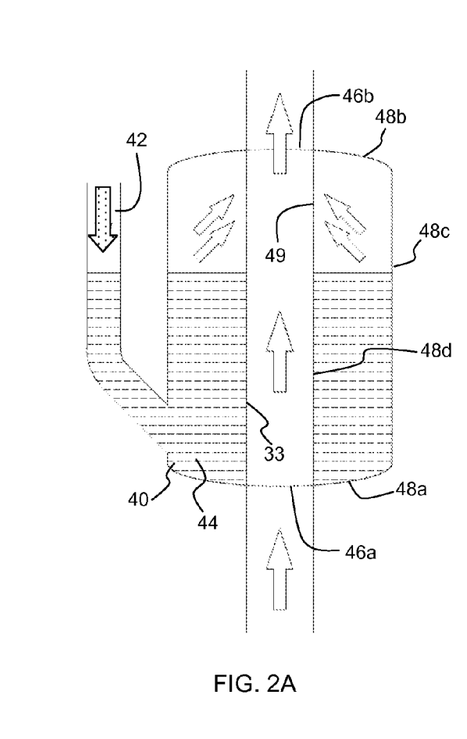
FIGS. 2A, 2B and 2C show side sectional views of the condensate reservoir according to examples of the present disclosure.
Figure 2B:
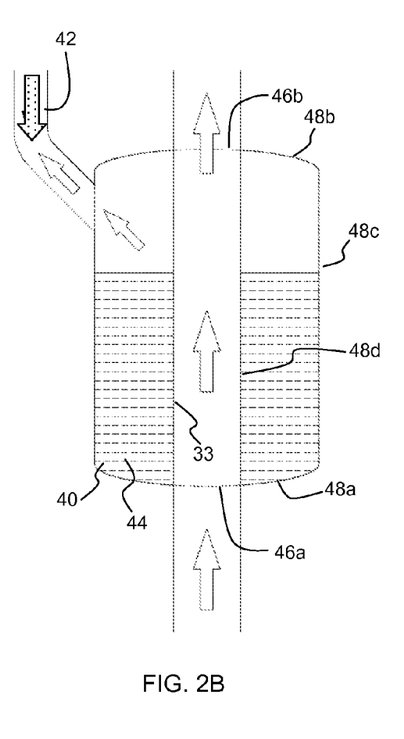
Figure 2C:
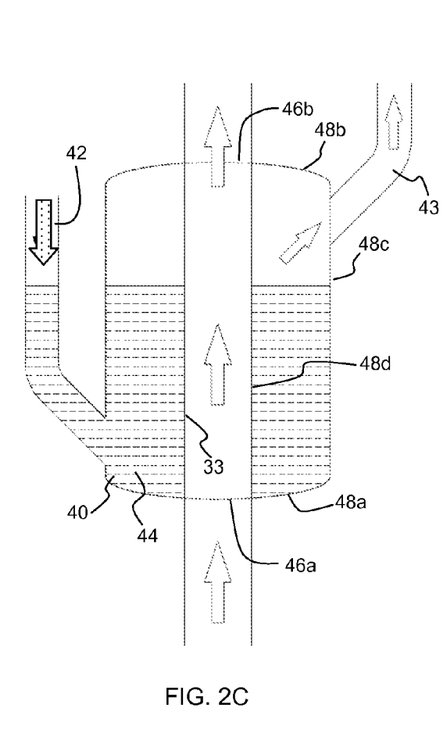

FIGS. 2A, 2B and 2C show examples of the condensate reservoir 40. (The dot filled arrows denote the flow of condensate, whereas the blank arrows denote the flow of vapour or gas.) As is shown, the condensate reservoir 40 may comprise a first opening 46a in a first wall 48a of the condensate reservoir. A duct 33 forming the second exhaust gas circulation loop 32 may pass through the first opening 46a. (The duct may comprise a flexible hose.) In addition, the condensate reservoir 40 may comprise a second opening 46b in a second wall 48b of the condensate reservoir. The duct 33 forming the second exhaust gas recirculation loop 32 may pass through the second opening 46b. The first and second openings 46a, 46b and first and second walls 48a, 48b may be opposite one another and the second exhaust gas recirculation loop 32 may pass through the condensate reservoir 40 by virtue of the openings 46a, 46b. Seals may be provided at the openings 46a, 46b between the first wall 48a and the exhaust gas duct 33 and between the second wall 48b and the exhaust gas duct 33 so that fluid in the condensate reservoir may not leak out.

The condensate reservoir 40 may further comprise one or more side walls 48c, which may for example extend between the first and second walls 48a, 48b. The side walls 48c may extend, e.g. circumferentially, about the second exhaust gas recirculation duct 33. The side walls 48c may also be spaced apart from the second exhaust gas recirculation duct 33, e.g. in a radial direction. In this way the first and second walls 48a, 48b and side walls 48c together with an outer wall 48d of the duct 33 may define the chamber 44 in which the liquid condensate may be collected.

The condensate reservoir 40 and the exhaust gas recirculation loop 32 are in thermal communication thanks to the second exhaust gas recirculation duct passing through the condensate reservoir 40. In particular, heat may be transferred through the duct 33 and into the chamber 44 in which the liquid condensate is collected. The transfer of heat may vaporise the liquid condensate to form water vapour in the chamber 44. The transfer of heat may also serve to reduce the temperature of the exhaust gases flowing in the second exhaust gas recirculation loop 32, which may serve to improve the performance of the internal combustion engine 10.

In the case of the example depicted in FIG. 2A, the water vapour generated in the condensate reservoir 40 may enter the second exhaust gas recirculation loop 32 through a permeable portion 49 in the wall 48d of the duct 33. The water vapour together with the recirculated exhaust gases may then enter the internal combustion engine 10. The permeable portion 49 may comprise one or more holes, e.g. drilled holes, a mesh portion or any other permeable membrane.

The permeable portion 49 may be provided at a point along the length of the duct 33 that is within the chamber 44 and is above the maximum anticipated level of the liquid condensate in the chamber 44 when the condensate reservoir is in an installed configuration. In this way liquid water collected in the chamber 44 may not pass through the permeable portion 49 and into the exhaust gas recirculation duct 32. Additionally or alternatively, the permeable portion 49 may be gas permeable only in that the permeable portion permits the flow of gas or vapour into the exhaust gas recirculation duct 32 but does not permit the flow of liquid into the exhaust gas recirculation duct 32.

By contrast, in the other examples shown in FIGS. 2B and 2C the duct 33 may not comprise a permeable portion and the transfer of fluid between the chamber 44 and the second exhaust gas recirculation duct 32 may not occur. In the case of the example shown in FIG. 2B, water vapour generated in the chamber 44 may return to the charge air cooler 16 via the passage 42. Alternatively, in the case of the example shown in FIG. 2C, a further passage 43 may be provided, which may permit the water vapour to be returned to the charge air cooler 16, delivered to the internal combustion engine 10 or vented to the atmosphere. The passage 43 may extend from the chamber 44 at or towards the top of the chamber in an installed configuration where the water vapour will collect, i.e. at a point away from the liquid.

The passage 42 from the charge air cooler 16 extends into one of the walls 48a, 48b, 48c of the condensate reservoir 40. Accordingly the liquid condensate collected from the charge air cooler 16 may be transported from the charge air cooler 16 to the chamber 44. In the particular examples shown in FIGS. 2A, 2B and 2C, the passage 42 may extend into the side wall 48c. In the examples shown in FIGS. 2A and 2C the passage 42 may extend into the chamber 44 at or towards the bottom of the chamber 44 when the condensate reservoir 40 is in an installed position. By contrast, in the example shown in FIG. 2B the passage 42 may extend into the chamber 44 at or towards the top of the chamber 44 when in the installed position.

Figure 3A:
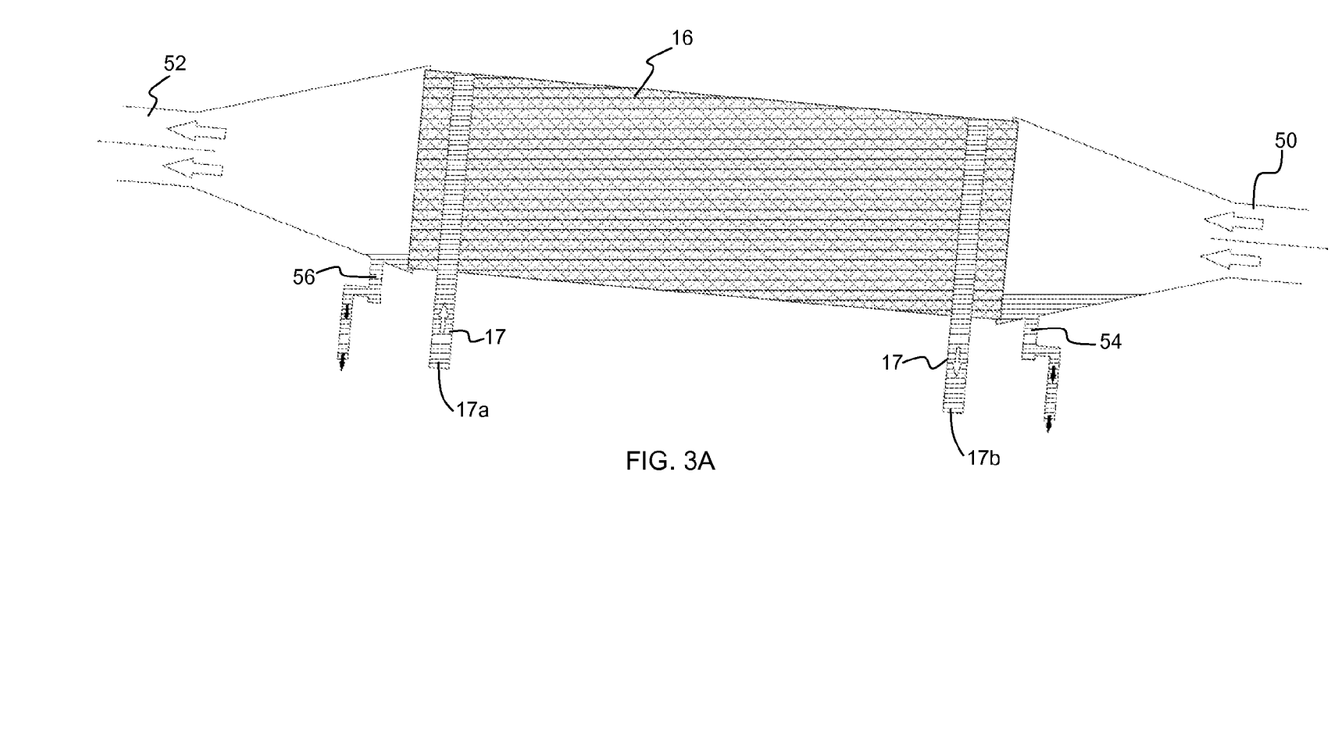
FIGS. 3A and 3B show side sectional views of a charge air cooler according to examples of the present disclosure.
Figure 3B:
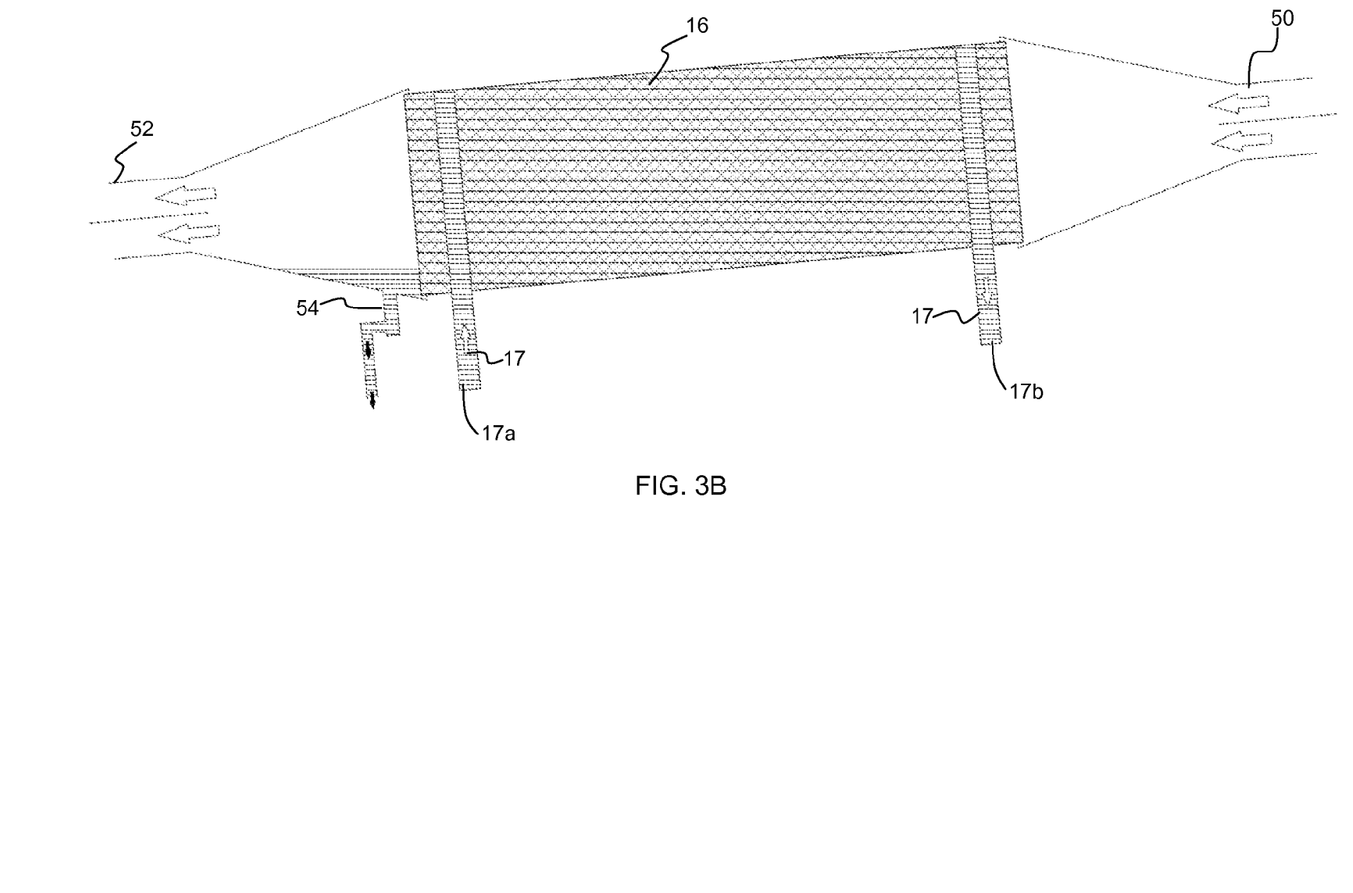

Referring now to FIGS. 3A and 3B, further details of the charge air cooler 16 will be described. The charge air cooler 16 has an air inlet 50 and an air outlet 52, which are provided at opposite ends of the charge air cooler. Incoming air may flow into the air inlet 50 through the charge air cooler 16 and out of the air outlet 52. The charge air cooler 16 is provided with the coolant passage 17 through which coolant from the cooling circuit of the engine may flow. The coolant in the coolant passage 17 and the air in the charge air cooler 16 may be in thermal communication such that heat may be transferred from the air to the coolant. In this way the charge air cooler acts as a heat exchanger. However the coolant passage 17 and the air flow path in the charge air cooler 16 may not be in fluidic communication. FIGS. 3A and 3B only partially depict the coolant passage 17 and it will be appreciated that the coolant passage 17 may define a convoluted passage and may be arranged so as to optimise the surface area exposed to the air flow path in the charge air cooler 16. The coolant may enter through coolant inlet 17a and leave through a coolant outlet 17b.

As is depicted in FIG. 3A the charge air cooler 16 may be orientated such that the bulk air flow through the charge air cooler is in a direction with an upwards component. By contrast, as depicted in FIG. 3B the charge air cooler 16 may be orientated such that the bulk air flow through the charge air cooler is in a direction with a downwards component. Alternatively, the charge air cooler 16 may be orientated horizontally such that the air flowing the charge air cooler flows in a direction that is substantially horizontal. As air flows through the charge air cooler it will be appreciated that moisture in the air may condense on the cooler walls of the coolant passage 17. It will further be appreciated that such condensate may collect towards the lower surfaces of the charge air cooler 16. For example, in the case of the arrangement depicted in FIG. 3A, coolant will tend to collect at the inlet end of the charge air cooler 16. By contrast, in the case of the arrangement depicted in FIG. 3B, condensate may tend to collect at the outlet end of the charge air cooler 16. Accordingly, a first condensate drain 54 may be provided at or towards the lowest point in the charge air cooler 16. For example, with the arrangement shown in FIG. 3A, the first drain 54 may be provided at the inlet end of the charge air cooler and in the arrangement shown in FIG. 3B the first drain 54 may be provided at the outlet end of the charge air cooler 16.

For the example depicted in FIG. 3A there may also be a tendency for condensate to collect near the higher outlet end of the charge air cooler 16, since the flow of air through the charge air cooler may cause liquid condensate within the charge air cooler to flow in the direction of the air flow. Accordingly, liquid condensate may collect towards the outlet end, particularly if there is a local depression in the lower surface in this region. Therefore, in the example shown in FIG. 3A, a second condensate drain 56 may be provided at or towards the outlet end of the charge air cooler.

The first drain 54 may be in fluidic communication with the condensate passage 42 such that condensate collected in the drain 54 may be transferred to the condensate reservoir 40. Similarly, the second drain 56 may also be in fluidic communication with the condensate passage 42, again so that condensate collected by the second drain 56 may be transferred to the condensate reservoir 40.

During use condensate may be collected in the charge air cooler and subsequently removed via the first and/or second drains 54, 56. As a result, the liquid condensate may be removed from the air flow and may therefore not enter the internal combustion engine 10. The liquid condensate collected in the drains 54, 56 may be transferred to the condensate reservoir 40, which as described above is provided about the second exhaust gas recirculation loop 32. Heat in the exhaust gases may cause the liquid condensate collected in the condensate reservoir 40 to vaporise and such vapour may be returned to the air flow path before entering the internal combustion engine 10 without causing the disadvantages associated with liquid water entering the engine.

A level sensor (not shown) may be provided to determine the amount of condensate collected in the condensate reservoir. Additionally or alternatively, a temperature sensor may be provided to determine the temperature of the condensate stored in the condensate reservoir. A temperature sensor to determine the temperature of the exhaust gases in the recirculation loop(s) 22, 32 may also be provided. The temperature of the coolant in coolant passage 17 may also be measured by a sensor. The values from any of these sensors may be monitored by an engine controller (not shown).

The controller may estimate the collection rate of condensate based on operational parameters, such as incoming air temperature, humidity and coolant temperature. The controller may further determine the vaporisation rate of the condensate in the condensate reservoir, for example based on the temperature of the exhaust gases in the exhaust gas recirculation loop, e.g. upstream of the condensate reservoir. The controller may compare the collection rate and the vaporisation rate. The flow rate of the exhaust gases in the exhaust gas recirculation loop may be adjusted, e.g. by varying the position of valve 34, as a result of this comparison. For example, the flow rate of the exhaust gases in the exhaust gas recirculation loop may be increased if the collection rate is higher than the vaporisation rate and conversely the flow rate of the exhaust gases in the exhaust gas recirculation loop may be decreased if the collection rate is lower than the vaporisation rate. Additionally or alternatively, the flow rate of the exhaust gases in the exhaust gas recirculation loop and thus the vaporisation rate may be adjusted according to the level of condensate in the reservoir, e.g. the vaporisation rate may be increased if the level is high or decreased if the level is low.

The controller may also adjust the flow rate of the exhaust gases in the exhaust gas recirculation duct to increase or decrease the rate of heat loss from the exhaust gases in the exhaust gas recirculation duct as required to improve the performance of the engine.

The present disclosure may be particularly advantageous in humid and/or wet conditions where the water content in the incoming air may be high. The condensate reservoir 40 may be sized so that it can contain the maximum anticipated amount of condensate that may be collected from the incoming air. The present disclosure may also be advantageously retrofitted to an existing engine, for example the second exhaust gas recirculation duct 33 may be passed through openings 46a, 46b of the condensate reservoir 40. Alternatively, the condensation reservoir 40 may be provided in one or more parts, e.g. halves, that may be joined together around the duct 33.

It will be appreciated by those skilled in the art that although the invention has been described by way of example with reference to one or more examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine system comprising:
an exhaust gas recirculation duct;
a charge air cooler (CAC);
a condensate reservoir having at least one inlet for receiving condensate from the CAC, and a chamber for collecting the condensate from the CAC, the reservoir in thermal communication with the exhaust gas recirculation duct such that thermal energy from the exhaust gas recirculation duct is transferred to the condensate reservoir to vaporise the condensate collected in the chamber; and
a controller configured to adjust an exhaust gas flow rate in the duct based on a rate of heat loss from exhaust gases in the duct to condensate in the reservoir.

2. The engine system of claim 1, wherein the condensate reservoir is disposable around the exhaust gas recirculation duct.

3. The engine system of claim 1, wherein the chamber of the condensate reservoir is defined by one or more walls of the condensate reservoir and an outer wall portion of the exhaust gas recirculation duct.

4. The engine system of claim 1, wherein the condensate reservoir comprises a first opening in a first wall of the condensate reservoir and a second opening in a second wall of the condensate reservoir, the first and second openings being configured to receive the exhaust gas recirculation duct such that the exhaust gas recirculation duct passes through the first and second openings.

5. The engine system of claim 1, wherein one or more of the inlets are arranged at or towards the top of the condensate reservoir when the condensate reservoir is in an installed configuration.

6. The engine system of claim 1, wherein one or more of the inlets are arranged at or towards the bottom of the condensate reservoir when the condensate reservoir is in an installed configuration.

7. The engine system of claim 1, wherein the CAC comprises one or more drains arranged to drain the condensate formed in an air passage of the CAC.

8. The engine system of claim 7, wherein the CAC comprises one or more drain channels configured to guide the condensate within the CAC toward the one or more drains.

9. The engine system of claim 1, further comprising one or more drain passages provided between the CAC and the condensate reservoir inlets to permit the condensate to collect in the condensate reservoir.

10. The engine system of claim 9, wherein the CAC comprises a charge air inlet chamber and a charge air outlet chamber and wherein the one or more drain passages extend from at least one of the charge air inlet chamber and the charge air outlet chamber to the condensate reservoir inlets.

11. The engine system of claim 1 wherein an outer wall portion of the exhaust gas circulation duct provides a wall of the chamber of the condensate reservoir, at least a portion of the outer wall portion being permeable to allow vaporized condensate to flow therethrough from the chamber to the duct.

12. A method of collecting condensate from an engine charge air cooler (CAC), the method comprising:
collecting condensate from the CAC into a chamber of a condensate reservoir;
transferring thermal energy from an engine exhaust gas recirculation duct to the reservoir to vaporise condensate collected in the chamber;
determining a vaporization rate of condensate in the reservoir; and
determining a rate of heat loss from exhaust gases in the duct to condensate in the reservoir.

13. The method of claim 12, wherein the method further comprises:
returning vaporised condensate to the CAC and then to the engine.

14. The method of claim 12, wherein the method further comprises:
determining an amount of condensate collected in the reservoir.

15. The method of claim 12, wherein the method further comprises:
estimating a collection rate of condensate based on operational parameters.

16. The method of claim 12, wherein the method further comprises:
determining a temperature of condensate stored in the reservoir.

17. The method of claim 12, wherein the method further comprises:
adjusting a flow rate of exhaust gases in the duct based on the rate of heat loss from exhaust gases in the duct to condensate in the reservoir.

18. The method of claim 15 further comprising increasing the flow rate of exhaust gases in the duct in response to the collection rate being higher than the vaporisation rate.

19. An engine system comprising:
- a reservoir having a chamber fluidly connected to a charge air cooler to collect condensate therefrom;
- an exhaust gas recirculation duct thermally coupled to the reservoir such that a rate of heat loss from exhaust gases in the duct to condensate in the chamber vaporizes the condensate; and
- a controller configured to adjust an exhaust gas flow rate in the duct in response to the rate of heat loss.

20. The engine system of claim 19 wherein the controller is further configured to adjust the exhaust gas flow rate in the duct in response a comparison between a condensate collection rate and a condensate vaporization rate in the chamber.

* * * * *